United States Patent

Harada

(10) Patent No.: US 10,486,667 B2
(45) Date of Patent: Nov. 26, 2019

(54) PRESSURE REGULATING RESERVOIR

(71) Applicant: ADVICS CO., LTD., Kariya-shi, Aichi-ken (JP)

(72) Inventor: Tomoo Harada, Kariya (JP)

(73) Assignee: ADVICS CO., LTD., Kariya-Shi, Aichi-Ken (JP)

(*) Notice: Subject to any disclaimer, the term of this patent is extended or adjusted under 35 U.S.C. 154(b) by 86 days.

(21) Appl. No.: 15/737,931

(22) PCT Filed: Jul. 15, 2016

(86) PCT No.: PCT/JP2016/070942
§ 371 (c)(1),
(2) Date: Dec. 19, 2017

(87) PCT Pub. No.: WO2017/010561
PCT Pub. Date: Jan. 19, 2017

(65) Prior Publication Data
US 2018/0170335 A1 Jun. 21, 2018

(30) Foreign Application Priority Data
Jul. 15, 2015 (JP) .................................. 2015-141329

(51) Int. Cl.
*B60T 8/48* (2006.01)
*B60T 13/14* (2006.01)
(Continued)

(52) U.S. Cl.
CPC .............. *B60T 8/4872* (2013.01); *B60T 8/00* (2013.01); *B60T 8/17* (2013.01); *B60T 8/48* (2013.01);
(Continued)

(58) Field of Classification Search
CPC . B60T 8/4822; B60T 8/00; B60T 8/17; B60T 8/48; B60T 13/142; B60T 13/148;
(Continued)

(56) References Cited
U.S. PATENT DOCUMENTS

2010/0052417 A1  3/2010 Aoba et al.
2012/0139333 A1* 6/2012 Terashima ............ B60T 13/145
                                                    303/115.1
(Continued)

FOREIGN PATENT DOCUMENTS

DE  10 2009 028 912 A1  3/2010
JP       2010-76747 A    4/2010
JP       2014-125101 A   7/2014

OTHER PUBLICATIONS

International Search Report (PCT/ISA/210) dated Aug. 30, 2016, by the Japanese Patent Office as the International Searching Authority for International Application No. PCT/JP2016/070942.
(Continued)

*Primary Examiner* — Melanie Torres Williams
(74) *Attorney, Agent, or Firm* — Buchanan, Ingersoll & Rooney PC

(57) ABSTRACT

In the present invention, when a first protrusion of a shaft abuts on a guide face thereby pressing a first valve element toward the top as seen in the drawing, the guide face is separated from a cylinder seat face, and a large-diameter oil passage is opened. At this time, when the first protrusion abuts on the guide face thereby driving the first valve element to the position where the valve opens, the first valve element is also pressed in a direction perpendicular to the reciprocating direction of the first valve element because the guide face has a spherical surface or a tapered surface. Thus, the first valve element is supported at two points, point E and point F or G, thereby dampening vibrations.

10 Claims, 6 Drawing Sheets

(51) Int. Cl.
*B60T 17/06* (2006.01)
*B60T 17/22* (2006.01)
*B60T 8/00* (2006.01)
*B60T 8/17* (2006.01)
*B60T 13/66* (2006.01)
*B60T 15/36* (2006.01)

(52) U.S. Cl.
CPC .......... *B60T 13/142* (2013.01); *B60T 13/148* (2013.01); *B60T 13/662* (2013.01); *B60T 15/36* (2013.01); *B60T 17/06* (2013.01); *B60T 17/221* (2013.01); *B60T 2270/203* (2013.01)

(58) Field of Classification Search
CPC ........ B60T 13/662; B60T 15/36; B60T 17/06; B60T 17/221
See application file for complete search history.

(56) References Cited

U.S. PATENT DOCUMENTS

2014/0116244 A1* 5/2014 Murayama .............. B60T 8/368
91/418
2014/0361204 A1* 12/2014 Kratzer .................. B60T 8/341
251/63.6

OTHER PUBLICATIONS

Written Opinion (PCT/ISA/237) dated Aug. 30, 2016, by the Japanese Patent Office as the International Searching Authority for International Application No. PCT/JP2016/070942.

* cited by examiner

[FIG.1]
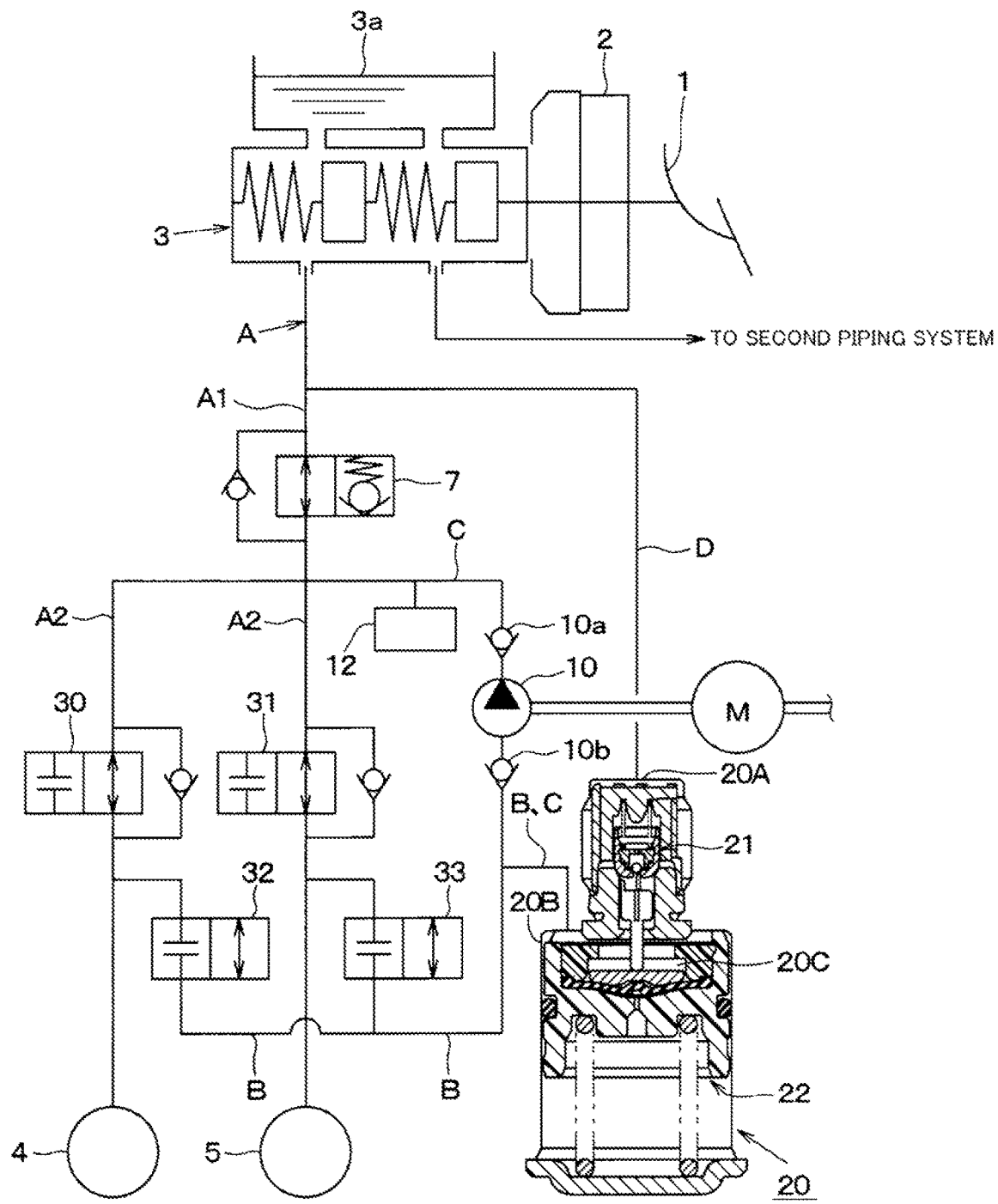

[FIG.2]
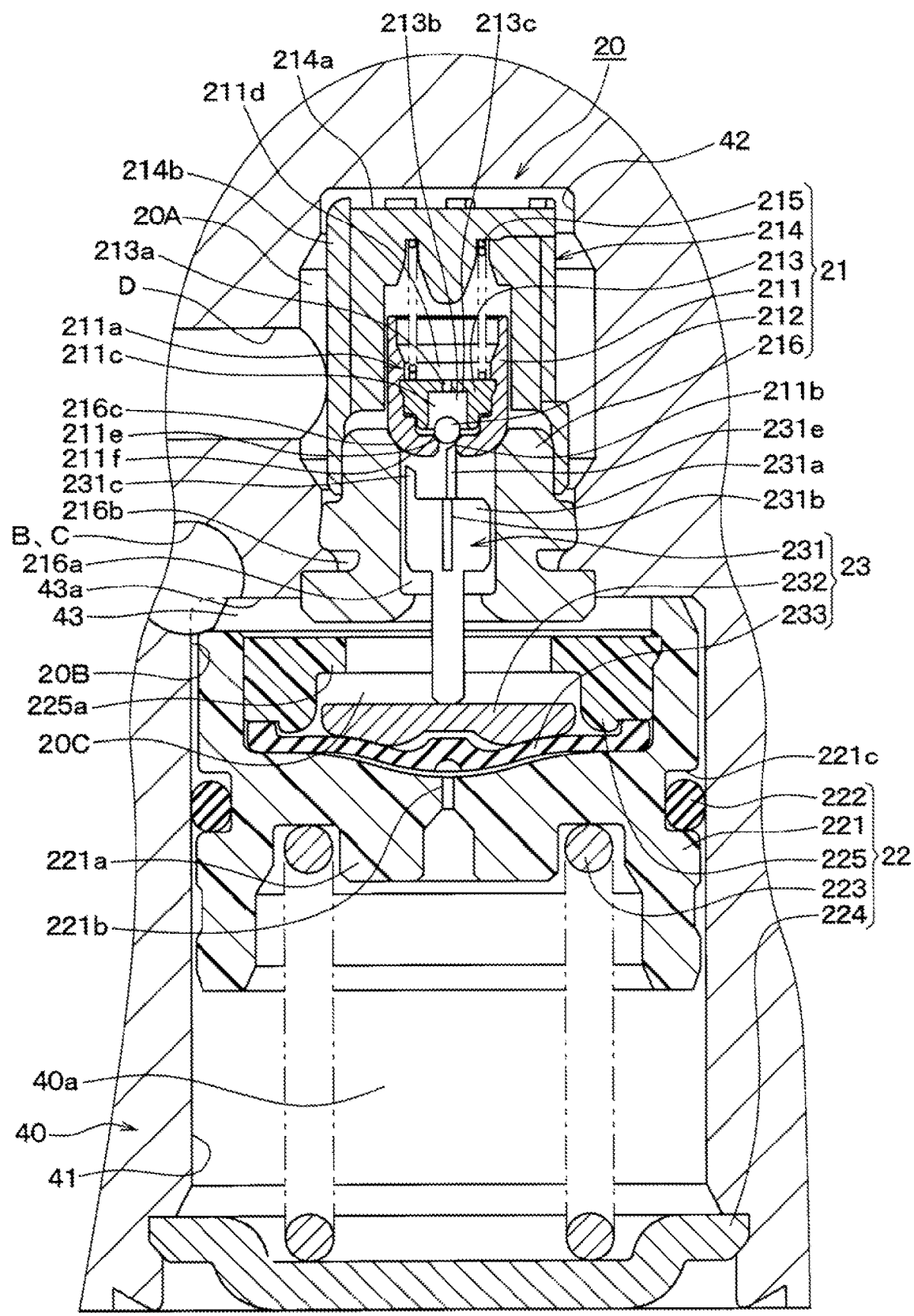

[FIG.3]
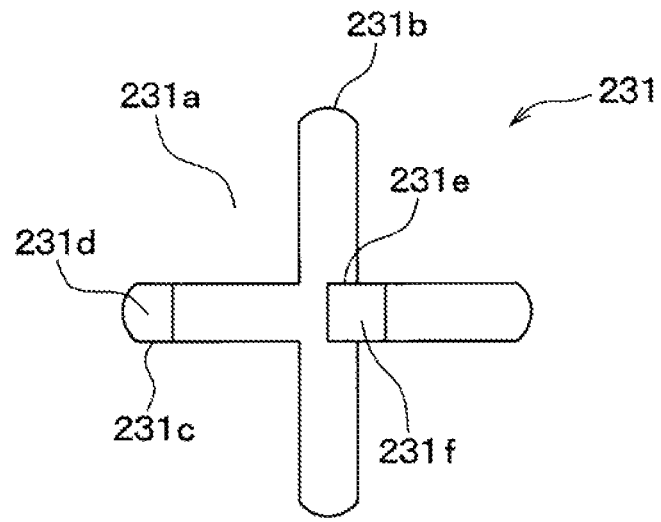
[FIG.4]
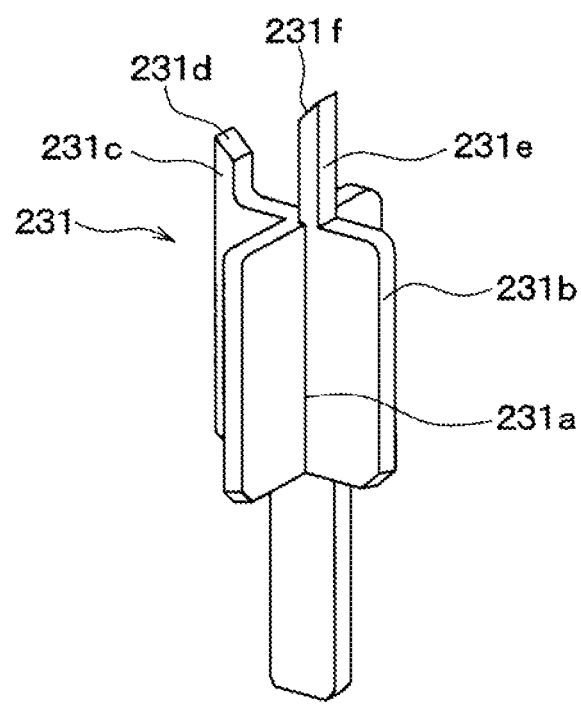

[FIG.5]
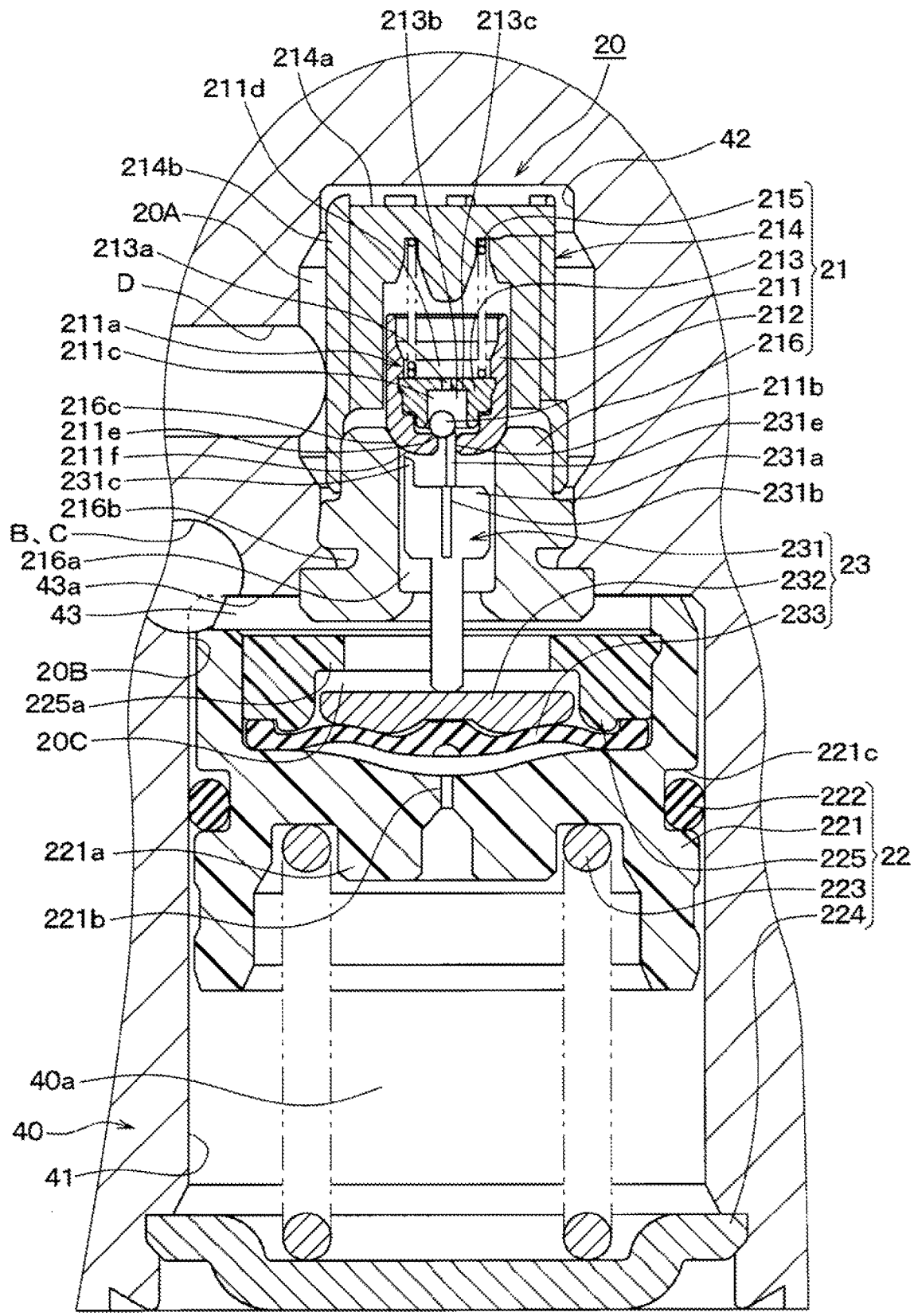

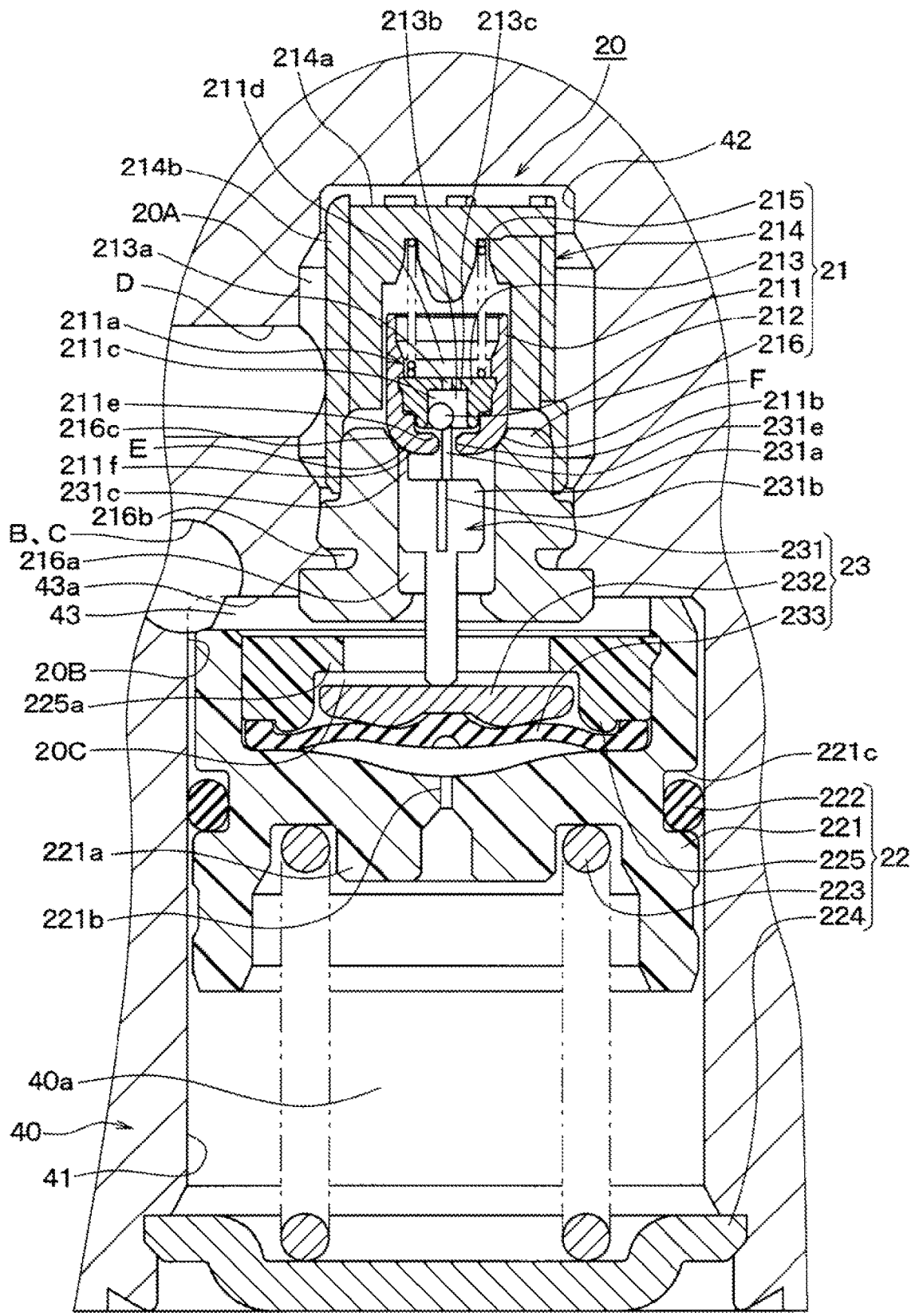

[FIG.7]
AT TIME OF SELF-SUCTION (HIGH LIFT)
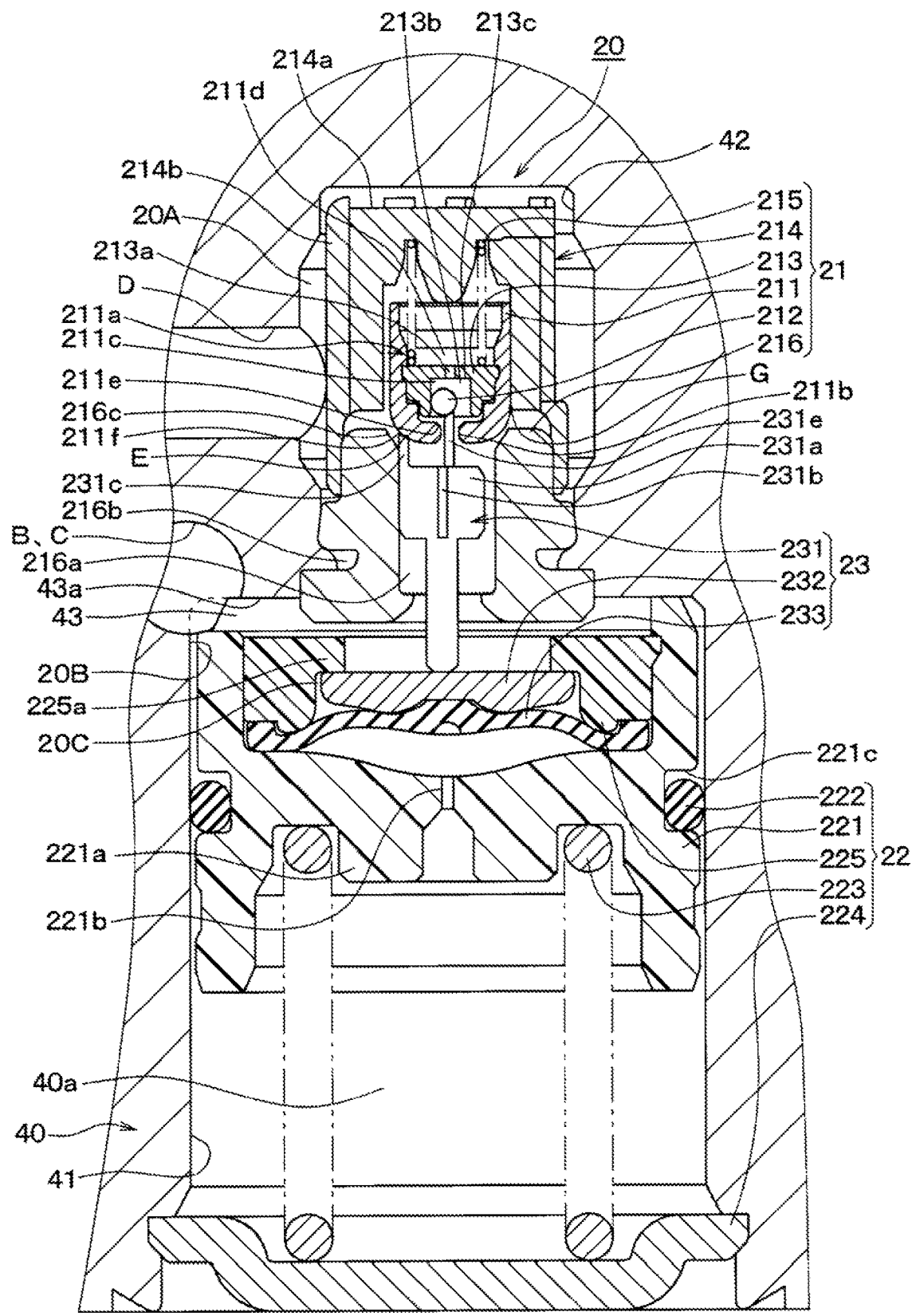

PRESSURE REGULATING RESERVOIR

TECHNICAL FIELD

The present invention relates to a pressure regulating reservoir including two valve elements.

BACKGROUND ART

Conventionally, as this type of pressure regulating reservoir, there is one disclosed in Patent Literature 1, for example. In the pressure regulating reservoir disclosed in Patent Literature 1, an in-cylinder passage and a cylinder seat face are formed in a cylinder (seat valve in Patent Literature 1) and a first valve element (valve in Patent Literature 1) arranged so as to be opposite to the cylinder seat face is brought into contact with and separates from the cylinder seat face, so that the in-cylinder passage is opened and closed. An intra-valve element passage is formed in the first valve element, an intra-valve element seat face is formed in the intra-valve element passage, and a second valve element (ball valve in Patent Literature 1) arranged in the intra-valve element passage is brought into contact with and separates from the intra-valve element seat face, so that the intra-valve element passage is opened and closed.

CITATIONS LIST

Patent Literatures

Patent Literature 1: JP 2010-76747 A

SUMMARY OF INVENTION

Technical Problems

However, in the conventional pressure regulating reservoir, when the first valve element is driven to a valve-opening position, the first valve element might vibrate in accordance with a flow of fluid and sound might be generated, so that further quietness of the pressure regulating reservoir is required along with quietness of a vehicle.

Specifically, a flow rate in a portion with a larger gap between the first valve element and the cylinder seat face is higher than that of a portion with a smaller gap. The first valve element is pulled toward a side of the higher flow rate (that is, the portion with the larger gap). As a result, the gap becomes smaller in the portion with the larger gap, and the gap becomes larger in the portion with the smaller gap, so that the first valve element is displaced in the opposite direction. As a result, the first valve element vibrates as the fluid flows.

The present invention is achieved in view of the above-described point, and an object thereof is to inhibit the vibration of the first valve element when the first valve element is driven to the valve-opening position.

Solutions to Problems

In order to achieve the above-described object, an invention is provided with: a housing (40) including an in-housing passage (D); a tubular cylinder (216) including an in-cylinder passage (216a) communicated with the in-housing passage inside and including a cylinder seat face (216c) enclosing an end on one end side of the in-cylinder passage; a tubular first valve element (211) including an intra-valve element passage (211b, 213a, and 213b) communicating the in-housing passage with the in-cylinder passage inside and including an intra-valve element seat face (211e) formed in the intra-valve element passage, the first valve element (211) brought into contact with and separating from the cylinder seat face to open and close a passage between the in-housing passage and the in-cylinder passage; a second valve element (212) arranged in the intra-valve element passage and brought into contact with and separating from the intra-valve element seat face to open and close the passage between the in-housing passage and the in-cylinder passage; a tubular holding member (214) in which the first valve element is arranged reciprocatably; and a shaft (231) arranged in the in-cylinder passage reciprocatably which drives the first valve element and the second valve element in a valve-opening direction, in which the first valve element includes a guide face (211f) on a side of a surface opposite to the cylinder seat face, the guide face being non-perpendicular to a reciprocating direction of the first valve element, the shaft includes a first protrusion (231c) capable of abutting the guide face and a second protrusion (231e) capable of abutting the second valve element, the second protrusion abuts the second valve element and the second valve element is driven in accordance with movement of the shaft in the valve-opening direction, so that the second valve element separates from the intra-valve element seat face and the passage between the in-housing passage and the in-cylinder passage is opened, and the first protrusion abuts the guide face and the first valve element is driven in accordance with further movement in the valve-opening direction of the shaft, so that the first valve element separates from the cylinder seat face and the passage between the in-housing passage and the in-cylinder passage is opened.

According to this, since the guide face is non-perpendicular to the reciprocating direction of the first valve element, when the first protrusion abuts the guide face and the first valve element is driven to the valve-opening position, the first valve element is pushed in the reciprocating direction of the first valve element and pushed also in a direction perpendicular to the reciprocating direction of the first valve element.

Accordingly, in a low lift region of the first valve element, the first valve element is supported by the first protrusion and abuts the cylinder seat face at a position shifted by substantially 180 degrees in a circumferential direction from a portion where the first protrusion abuts to be supported by the cylinder. Also, in a high lift region of the first valve element, the first valve element is supported by the first protrusion and abuts a holding member at a position shifted by substantially 180 degrees in the circumferential direction from the portion where the first protrusion abuts to be supported by the holding member.

In this manner, when the first valve element is driven to the valve-opening position, the first valve element is supported at two points, so that vibration of the first valve element when the first valve element is driven to the valve-opening position is inhibited.

In further detail, a gap between the first valve element and the cylinder seat face is larger on a side supported by the first protrusion. Therefore, as fluid flows, the first valve element tends to displace toward the side supported by the first protrusion, but the displacement is blocked by the first protrusion, so that the vibration of the first valve element is inhibited.

An invention is a pressure regulating reservoir used in a vehicle brake device provided with a brake fluid pressure generating unit (1 to 3) which generates brake fluid pressure on the basis of operation of a brake operating member (1);

wheel braking force generating units (4 and 5) which generate braking force on wheels; and a pump (10) which sucks and discharges brake fluid, the regulating reservoir provided with: a housing (40) including an inflow pipeline (D) in which the brake fluid from the brake fluid pressure generating unit flows; a reservoir chamber (20C) which stores the brake fluid and to which a suction port of the pump is connected; a piston unit (22) including a piston (221) which makes capacity of the reservoir chamber variable and a spring (223) arranged on a side opposite to the reservoir chamber across the piston to bias the piston in a direction to decrease the capacity of the reservoir chamber; a movable portion (232, 233) displaced on the basis of differential pressure between pressure in a back chamber (40b) located on a side opposite to the reservoir chamber across the piston and pressure in the reservoir chamber; a tubular cylinder (216) including an in-cylinder passage (216a) communicating the reservoir chamber with the inflow pipeline inside and including a cylinder seat face (216c) enclosing an end on one end side of the in-cylinder passage; a tubular first valve element (211) including an intra-valve element passage (211b, 213a, and 213b) communicating the inflow pipeline with the in-cylinder passage inside and including an intra-valve element seat face (211e) formed in the intra-valve element passage, the first valve element (211) brought into contact with and separating from the cylinder seat face to open and close a passage between the inflow pipeline and the in-cylinder passage; a second valve element (212) arranged in the intra-valve element passage and brought into contact with and separating from the intra-valve element seat face to open and close the passage between the inflow pipeline and the in-cylinder passage; a tubular holding member (214) in which the first valve element is arranged reciprocatably; and a shaft (231) arranged in the in-cylinder passage reciprocatably which drives the first valve element and the second valve element in a valve-opening direction by moving in accordance with the displacement of the movable portion when the capacity of the reservoir chamber decreases, in which the first valve element includes a guide face (211f) on a side of a surface opposite to the cylinder seat face, the guide face being non-perpendicular to a reciprocating direction of the first valve element, the shaft includes a first protrusion (231c) capable of abutting the guide face and a second protrusion (231e) capable of abutting the second valve element, the second protrusion abuts the second valve element and the second valve element is driven in accordance with movement of the shaft in the valve-opening direction, so that the second valve element separates from the intra-valve element seat face and the passage between the inflow pipeline and the in-cylinder passage is opened, and the first protrusion abuts the guide face and the first valve element is driven in accordance with further movement in the valve-opening direction of the shaft, so that the first valve element separates from the cylinder seat face and the passage between the inflow pipeline and the in-cylinder passage is opened.

According to this, it is possible to obtain the effect similar to that of the invention.

Meanwhile, reference signs in parentheses of each unit herein described and recited in claims indicate the correspondence with a specific unit described in an embodiment to be described later.

BRIEF DESCRIPTION OF DRAWINGS

FIG. 1 is a schematic piping diagram of a brake device to which a pressure regulating reservoir according to one embodiment of the present invention is applied.

FIG. 2 is a cross-sectional view of the pressure regulating reservoir of FIG. 1.

FIG. 3 is a top view of a shaft of FIG. 2.

FIG. 4 is a perspective view of the shaft of FIG. 2.

FIG. 5 is a cross-sectional view for illustrating operation of the pressure regulating reservoir at the time of pressure regulation.

FIG. 6 is a cross-sectional view for illustrating operation of the pressure regulating reservoir at the time of self-suction (low lift state).

FIG. 7 is a cross-sectional view for illustrating the operation of the pressure regulating reservoir at the time of self-suction (high lift state).

DESCRIPTION OF EMBODIMENTS

A brake device provided with a pressure regulating reservoir according to one embodiment of the present invention is described with reference to FIG. 1, and the pressure regulating reservoir provided on the brake device is described with reference to FIGS. 2 and 3. Meanwhile, a case in which the brake device according to this embodiment is applied to a vehicle in which an X piping hydraulic circuit provided with piping systems of a right front wheel to a left rear wheel and a left front wheel to a right rear wheel is formed is herein described; this may also be applied to front and rear piping and the like.

As illustrated in FIG. 1, a brake pedal 1 as a brake operating member depressed by a driver when a braking force is applied to the vehicle is connected to a booster 2, and a pedaling force applied to the brake pedal 1 is boosted by the booster 2.

The booster 2 includes a push rod and the like for transmitting the boosted pedal force to a master cylinder (hereinafter referred to as M/C) 3, and the push rod pushes a master piston arranged in the M/C 3 to generate M/C pressure. A master reservoir 3a which supplies brake fluid into the M/C 3 and stores surplus brake fluid in the M/C 3 is connected to the M/C 3.

The M/C pressure is transmitted to wheel cylinders (hereinafter referred to as W/Cs) 4 and 5 of respective wheels through an ABS actuator. Although only a first piping system connected to the W/C 4 for a right front wheel FR and the W/C 5 for a left rear wheel RL is illustrated in FIG. 1, a second piping system connected to a side of a left front wheel FL and a right rear wheel RR also has the structure similar to that of the first piping system. Although a side of the right front wheel FR and the left rear wheel RL is hereinafter described, the same applies to the side of the left front wheel FL and the right rear wheel RR being the second piping system.

The brake device is provided with a pipeline (main pipeline) A connected to the M/C 3. The pipeline A is provided with a differential pressure control valve 7, and the pipeline A is divided into two parts at a position of the differential pressure control valve 7. Specifically, the pipeline A is divided into a pipeline A1 which receives the M/C pressure between the M/C 3 and the differential pressure control valve 7, and a pipeline A2 between the differential pressure control valve 7 and each of the W/Cs 4 and 5.

The differential pressure control valve 7 controls a communicating state and a differential pressure state. Although the differential pressure control valve 7 is normally in the communicating state, the pressure on a side of the W/Cs 4 and 5 may be maintained to be higher than that on a side of the M/C 3 by predetermined differential pressure by putting the differential pressure control valve 7 into the differential pressure state.

Furthermore, in the pipeline A2, the pipeline A branches into two parts, one of which provided with a pressure increasing control valve 30 for controlling an increase in the brake fluid pressure to the W/C 4, and the other provided with a pressure increasing control valve 31 for controlling an increase in the brake fluid pressure to the W/C 5.

The pressure increasing control valves 30 and 31 are formed as two-position valves capable of controlling the communicating/blocking state by an electronic control unit (hereinafter referred to as an ECU) for controlling brake fluid pressure not illustrated. When the two-position valve is controlled to be in the communicating state, the M/C pressure and the brake fluid pressure based on discharge and the like of a pump 10 to be described later may be applied to each of the W/Cs 4 and 5. The pressure increasing control valves 30 and 31 are normally put into the communicating state at the time of regular braking in which the brake fluid pressure control such as ABS control is not executed.

Also, a pipeline B is connected between the pressure increasing control valves 30 and 31 and the W/Cs 4 and 5, respectively, in the pipeline A, and the pipeline B is connected to a reservoir hole 20B of a pressure regulating reservoir 20. It is configured such that the brake fluid pressure in the W/Cs 4 and 5 is controlled by allowing the brake fluid to flow to the pressure regulating reservoir 20 through the pipeline B, so that locking tendency of each wheel is prevented. Meanwhile, the pressure regulating reservoir 20 is described later in detail.

Pressure decreasing control valves 32 and 33 capable of controlling the communicating/blocking state by the ECU are also arranged in the pipeline B. The pressure decreasing control valves 32 and 33 are normally put into the blocking state at the time of regular braking and are appropriately put into the communicating state when the brake fluid is allowed to flow to the above-described pressure regulating reservoir 20.

A pipeline C is connected between the differential pressure control valve 7 and the pressure increasing control valves 30 and 31 in the pipeline A, and the pipeline A and the reservoir hole 20B of the pressure regulating reservoir 20 are connected to each other through the pipeline C. The brake fluid discharged to the pressure regulating reservoir 20 at the time of ABS control is returned to the pipeline A through the pipeline C when the pump is operated to increase W/C pressures. In the pipeline C, the pump 10 is arranged together with check valves 10a and 10b, and in order to ease pulsation of the brake fluid discharged by the pump 10, an accumulator 12 is arranged downstream of the pump 10 in the pipeline C. A pipeline D is also provided so as to connect a reservoir hole 20A to the M/C 3, and the pump 10 collects the brake fluid in the pipeline A1 through the pipeline D and the pressure regulating reservoir 20, and discharges the same through a part of the pipeline B and the pipeline C to the pipeline A2, thereby increasing the W/C pressure.

Next, a configuration of the above-described pressure regulating reservoir 20 is described with reference to FIG. 2.

In addition to be used in the ABS control, the pressure regulating reservoir 20 is used for adjusting a flow volume of the brake fluid when this is sucked from the M/C 3 side by operation of the pump 10 in order to generate the W/C pressure larger than the M/C pressure for the W/Cs 4 and 5 during the generation of the M/C pressure. Adjustment of the flow volume of the brake fluid to a suction port of the pump 10 is performed by adjusting the pressure such that differential pressure between the M/C pressure and the pressure in the pressure regulating reservoir 20 (hereinafter referred to as reservoir inner pressure) is balanced; this state is referred to as pressure regulation in this specification.

The pressure regulating reservoir 20 is built in a housing 40 forming an outer shape of the ABS actuator, and the reservoir holes 20A and 20B and a reservoir chamber 20C are formed of an inner wall surface and the like of a concave portion 41 formed in the housing 40. The concave portion 41 is formed to have a stepped shape in which first and second concave portions 42 and 43 are continuously formed, the first concave portion 42 is further formed on an upper end face 43a of the second concave portion 43 formed of one surface of the housing 40. An inner diameter of the first concave portion 42 which is deeper is made smaller than that of the second concave portion 43 which is shallower. Central axes of the second concave portion 43 and the first concave portion 42 are made parallel to each other, and coincide with each other in the case of this embodiment. The reservoir hole 20A is formed of the first concave portion 42, the reservoir hole 20B is formed of the second concave portion 43, and the reservoir chamber 20C is formed of an inner wall surface and the like of the second concave portion 43.

The reservoir hole 20A is connected to the M/C 3 to receive a flow of the brake fluid from the pipeline D as an inflow pipeline or an in-housing passage with pressure equivalent to the M/C pressure. The reservoir hole 20B connects the pipelines B and C as outflow pipelines to the reservoir chamber 20C. The reservoir chamber 20C is a chamber sectioned by the inner wall surface of the second concave portion 43, a piston main body 221 to be described later and the like for storing the brake fluid flowing through the reservoir hole 20A or the reservoir hole 20B and delivering the same through the reservoir hole 20B. Herein, the pipelines B, C, and D form a "fluid flow path" communicated with the reservoir chamber 20C.

A check valve 21 is provided on the first concave portion 42 in which the reservoir hole 20A is formed. The check valve 21 includes a first valve element 211, a second valve element 212, a holding plate 213, a filter component 214, a spring 215, and a cylinder 216.

The first valve element 211 formed of iron-based metal and the like to have a bottomed cylindrical shape includes a guide face 211f on a side of a surface opposite to a cylinder seat face 216c (to be described later in detail) formed in a cylinder 216, is the guide face 211f being not perpendicular to a reciprocating direction of the first valve element 211 (that is, an axial direction of the first valve element 211, an up-and-down direction of FIG. 2). In further detail, a diameter of the guide face 211f is made larger in a valve-opening direction of the first valve element 211 (that is, in a direction away from the cylinder seat face 216c). Specifically, a spherical surface or a tapered surface may be adopted as the guide face 211f.

The first valve element 211 opens and closes a passage between a large-diameter oil passage 216a formed in the cylinder 216 and the pipeline D by the guide face 211f brought into contact with and separating from the cylinder seat face 216c.

When the large-diameter oil passage 216a of the cylinder 216 is closed, the first valve element 211 forms a brake fluid flow path having a smaller diameter than that of the large-diameter oil passage 216a of the cylinder 216. Specifically, a hollow portion 211a serving as the brake fluid flow path is formed on an axial line of the first valve element 211.

The hollow portion 211a is formed to have a stepped shape such that the brake fluid flow path gradually becomes smaller toward the cylinder 216. A side the closest to the cylinder 216 of the hollow portion 211a serves as a small-diameter oil passage 211b which forms an oil passage connected to the pipelines B and C with a smaller diameter (smaller passage area) than that of the large-diameter oil passage 216a.

The second valve element 212 is arranged in a first accommodating unit 211c having a larger diameter than that of the small-diameter oil passage 211b on a side opposite to the cylinder 216 across the small-diameter oil passage 211b in the hollow portion 211a, and the holding plate 213 is arranged in a second accommodating unit 211d having a larger diameter than the first accommodating unit 211c. A boundary between the small-diameter oil passage 211b and the first accommodating unit 211c in the first valve element 211 is a tapered intra-valve element seat face 211e with which the second valve element 212 is brought into contact and from which this separates.

The second valve element 212 formed of iron-based metal and the like is formed of a ball having a smaller diameter than that of the first accommodating unit 211c and larger than that of the small-diameter oil passage 211b. The second valve element 212 is brought into contact with and separates from the intra-valve element seat face 211e of the first valve element 211, thereby opening and closing the small-diameter oil passage 211b.

The holding plate 213 is made of iron-based metal and the like for holding the second valve element 212 in the first valve element 211. The second valve element 212 is held in the first valve element 211 by the holding plate 213 and the small-diameter oil passage 211b is closed by the second valve element 212 at the time of the regular braking.

In this embodiment, a structure is such that the holding plate 213 is press-fitted to an inner peripheral surface of the first valve element 211, so that this is integrated with the first valve element 211. In other words, the holding plate 213 substantially forms a part of the first valve element 211.

A tip end of the holding plate 213 is brought into contact with the stepped portion of the first valve element 211, so that the holding plate 213 is fixed in a state of being positioned on the first valve element 211. Also, the holding plate 213 has a cylindrical shape with a flange formed at one end and has a shape in which a communication passage 213a extending in the axial direction is formed at one or a plurality of positions. The brake fluid is allowed to flow through the communication passage 213a, so that the brake flow path is secured.

Furthermore, a concave portion 213b in which the second valve element 212 is accommodated is formed at a tip end in an insertion direction to the first valve element 211 of the holding plate 213. A depth of the concave portion 213b is set such that the second valve element 212 does not abut a bottom surface 213c of the concave portion 213b even in a state in which a deformation amount of a diaphragm 233 to be described later is the largest, in other words, in a state in which a shaft 231 is fully pushed up (refer to FIG. 7).

It is to be noted that the small-diameter oil passage 211b, the concave portion 213b, and the communication passage 213a form an intra-valve element passage of the present invention.

The filter component 214 as a holding member made of metal, resin and the like is formed by arranging six columnar members 214b at regular intervals on a circular bottom surface portion 214a and enclosing a periphery of the columnar member 214b by a meshed-shaped filter (not illustrated). By combining the bottom surface portion 214a and the columnar members 214b, the filter component 214 has a cylindrical shape or a substantially cup shape. The first valve element 211 is arranged within the filter component 214 freely reciprocatably.

The spring 215 is arranged between the holding plate 213 and the filter component 214 to bias the holding plate 213 and the first valve element 211 toward the cylinder 216 by elastic force.

The cylinder 216 is formed of a cylindrical member made of iron-based metal and the like and has a structure provided with the large-diameter oil passage 216a as an in-cylinder passage formed of a hollow portion thereof. The large-diameter oil passage 216a forms an inflow passage (fluid flow path) for allowing the brake fluid being fluid to flow from the pipeline D into the reservoir chamber 20C. The shaft 231 is inserted into the large-diameter oil passage 216a and guided reciprocatably while being held by an inner wall surface of the large-diameter oil passage 216a in the cylinder 216.

The tapered cylinder seat face 216c is formed at an end of the cylinder 216 on a side of the first valve element 211 so as to enclose an end on one end side of the large-diameter oil passage 216a.

An outer diameter at a tip end of the cylinder 216 on a side of the filter component 214 is made equivalent to or slightly larger than an inner diameter of an opening of the filter component 214. After the first valve element 211, the second valve element 212, the holding plate 213, and the spring 215 are accommodated in the filter component 214, the cylinder 216 is press-fitted into the opening of the filter component 214, so that the components are integrated to form a unitized check valve 21.

An outer peripheral surface of the cylinder 216 is formed to have a stepped shape, and the outer diameter thereof is made the largest at a tip end position opposite to the filter component 214. The outer diameter is made larger than an inner diameter of an inlet side of the first concave portion 42. Therefore, by inserting the cylinder 216 together with the filter component 214 and the like in the first concave portion 42, a part of the housing 40 is caulked by the portion having the largest outer diameter of the cylinder 216, such that the check valve 21 is held in the housing 40.

Meanwhile, an annular groove 216b which goes around the outer peripheral surface is formed around the outer peripheral surface of the cylinder 216, and when a part of the housing 40 enters the annular groove 216b, the check valve 21 may be firmly held in the housing 40.

On the other hand, a piston unit 22 and a valve opening/closing mechanism unit 23 are provided in the second concave portion 43 in which the reservoir hole 20B is formed.

The piston unit 22 includes the piston main body 221, an O-ring 222, a spring 223, a cover 224, and a stopper 225.

The piston main body 221 is made of resin and the like. The piston main body 221 is configured to slide along the inner wall surface of the second concave portion 43 in the up-and-down direction of the drawing. The valve opening/closing mechanism unit 23 is arranged at a center position of the piston main body 221. Specifically, the piston main body 221 is formed to have a cylindrical shape provided with a partition wall portion 221a, and the valve opening/closing mechanism unit 23 is accommodated in an accommodating unit on a side closer to the check valve 21 than the partition wall portion 221a. Also, a communicating hole 221b is provided at a center position of the partition wall portion 221a, and pressure (atmospheric pressure) in a back chamber 40a is transmitted into the valve opening/closing mechanism unit 23.

The O-ring 222 is provided on an outer peripheral surface of the piston main body 221. An annular groove 221c is provided in a portion of the piston main body 221 where the O-ring 222 is arranged, and the O-ring 222 is fitted in the annular groove 221c.

The spring 223 is arranged between the piston main body 221 and the cover 224 and is brought into contact with the partition wall portion 221a of the piston main body 221, thereby biasing the piston main body 221 toward the check valve 21, that is, in a direction to decrease capacity of the reservoir chamber 20C.

The cover 224 serves to receive the spring 223. The cover 224 is caulked to be fixed to an inlet of a hollow portion of the housing 40. Meanwhile, although not illustrated in FIG. 2, an atmosphere introduction hole is provided at a desired position of the cover 224, so that pressure in the back chamber 40a formed between the piston main body 221 and the cover 224 is kept at atmospheric pressure.

The stopper 225 being a ring-shaped member made of resin, iron-based metal and the like is supported by the piston main body 221 as a support member. The stopper 225 serves to fix an outer edge of the diaphragm 233 by pressing the same against the piston main body 221 side and to regulate movement of a plate 232 to be described later toward an upper side of the drawing (in a shaft direction). The stopper 225 is configured to be hooked at a tip end position on the check valve 21 side on an inner peripheral surface of the piston main body 221, and by press-fitting the stopper 225 into the piston main body 221 in a state in which the diaphragm 233 and the plate 232 arranged, the stopper 225 is fixed within the piston main body 221 together with the diaphragm 233 and the plate 232 by snap foot. The stopper 225 is provided with a flange portion 225a protruding from an inner peripheral surface of the stopper 225 toward the center and a hole diameter of the flange portion 225a is made smaller than an outer diameter of the plate 232, so that movement of the plate 232 is regulated by the flange portion 225a.

Also, the valve opening/closing mechanism unit 23 is formed of the shaft 231, the plate 232, and the diaphragm 233.

The shaft 231 is arranged freely reciprocatably in the large-diameter oil passage 216a of the cylinder 216.

As illustrated in FIGS. 2 to 4, the shaft 231 has a cruciform portion 231b having a cruciform sectional shape perpendicular to the axial direction with a plurality of slits 231a provided so as to be parallel to the axial direction at regular intervals in a circumferential direction. Therefore, it is configured such that the brake fluid may flow through the slit 231a in the cruciform portion 231b.

A first protrusion 231c extending from an end of the cruciform portion 231b on a side of the first valve element 211 toward the guide face 211f of the first valve element 211 is provided in the vicinity of the inner wall surface of the large-diameter oil passage 216a of the shaft 231. At a tip end of the first protrusion 231c, a first protrusion tapered surface 231d inclined with respect to a reciprocating direction of the shaft 231 (that is, the axial direction of the shaft 231 and the large-diameter oil passage 216a, the up-and-down direction of FIG. 2) is formed. In further detail, the first protrusion tapered surface 231d is an inclined surface in which a radially outer side of the shaft 231 is higher than a radially inner side of the shaft 231. Then, as the shaft 231 moves in a valve-opening direction of the first valve element 211, the first protrusion tapered surface 231d abuts the guide face 211f.

A second protrusion 231e extending from the end of the cruciform portion 231b on the side of the first valve element 211 toward the second valve element 212 with a tip end side inserted into the small-diameter oil passage 211b is provided in the vicinity of the center in the radial direction of the large-diameter oil passage 216a of the shaft 231. The second protrusion 231e is arranged so as to be shifted from a central axis of the shaft 231. In further detail, the second protrusion 231e is arranged so as to be offset with respect to the central axis of the shaft 231 in a direction opposite to the first protrusion 231c. A second protrusion tapered surface 231f inclined with respect to the reciprocating direction of the shaft 231 is formed at a tip end of the second protrusion 231e. As the shaft 231 moves in the valve-opening direction of the first valve element 211, the second protrusion tapered surface 231f abuts the second valve element 212.

Meanwhile, when the shaft 231 moves in the valve-opening direction of the first valve element 211, first, the second protrusion tapered surface 231f abuts the second valve element 212, and when the shaft 231 further moves in the valve-opening direction of the first valve element 211, the first protrusion tapered surface 231d abuts the guide face 211f.

As illustrated in FIG. 2, the plate 232 serves to move the shaft 231 toward the first valve element 211 and the second valve element 212 and to regulate a movement amount of the shaft 231. The plate 232 is formed of a disc-shaped member made of, for example, iron-based metal and the like. The plate 232 is moved in the up-and-down direction of FIG. 2 in accordance with the deformation of the diaphragm 233, however, a movement amount toward the upper side of FIG. 2 is regulated by an outer edge of the plate 232 brought into contact with the stopper 225. Therefore, even when the shaft 231 is moved in accordance with the movement of the plate 232, the movement amount thereof is equivalent to a distance until the plate 232 is brought into contact with the stopper 225.

The diaphragm 233 is made of an elastic material, for example, rubber, and is arranged between the plate 232 and the partition wall portion 221a. When the brake fluid pressure control is not operated, the diaphragm 233 has a flat shape as illustrated in FIG. 2; however, when the differential pressure between the reservoir inner pressure and the pressure (atmospheric pressure) in the back chamber 40a is generated, this is deformed based on this. That is, when the pressure in the reservoir chamber 20C becomes negative pressure due to the suction of the brake fluid by the pump 10, the pressure becomes lower than the atmospheric pressure in the back chamber 40a, so that the diaphragm 233 is deformed. Due to this deformation, the diaphragm 233 pushes the plate 232 to the upper side of the drawing, and the shaft 231 is moved. Meanwhile, the plate 232 and the diaphragm 233 form a movable portion of the present invention.

The pressure regulating reservoir 20 according to this embodiment is formed in the above-described manner. Next, operation of the pressure regulating reservoir 20 is described with reference to FIG. 2 and FIGS. 5 to 7.

First, at the time of the regular braking, since the pump 10 is not driven and the reservoir inner pressure and the brake fluid pressure are balanced, the diaphragm 233 is not deformed. Therefore, as illustrated in FIG. 2, since the shaft 231 is not moved to the upper side of the drawing, the first protrusion tapered surface 231d separates from the guide face 211f and the second protrusion tapered surface 231f separates from the second valve element 212. As a result, the guide face 211f is seated on the cylinder seat face 216c and the large-diameter oil passage 216a is closed, and the second valve element 212 is seated on the intra-valve element seat face 211e and the small-diameter oil passage 211b is closed.

Therefore, the check valve 21 is closed, and even when the M/C pressure is applied to the reservoir hole 20A due to depression of the brake pedal 1, it is possible to prevent the brake fluid from flowing into the reservoir chamber 20C. This makes it possible to close the check valve 21 at the time of the regular braking and to prevent unnecessary consumption of the brake fluid.

Next, at the time of pressure regulation, for example, when pressurization assist (brake assist control) is executed, when the brake pedal 1 is depressed and the M/C pressure is applied to the reservoir hole 20A, the pump 10 is driven, so that the pressure in the reservoir chamber 20C becomes negative pressure. Therefore, as illustrated in FIG. 5, the diaphragm 233 is deformed, and accordingly the plate 232 moves to the upper side of the drawing, so that the shaft 231 is also pushed to the upper side of the drawing. Then, the second protrusion tapered surface 231f abuts the second valve element 212 and the second valve element 212 is pushed to the upper side of the drawing, and the second valve element 212 separates from the intra-valve element seat face 211e and the small-diameter oil passage 211b is opened.

At that time, since the M/C pressure is applied to the reservoir hole 20A, an interval of a gap between the second valve element 212 and the intra-valve element seat face 211e is maintained such that the differential pressure between the M/C pressure and the reservoir inner pressure is balanced, and the reservoir inner pressure is regulated. Therefore, the deformation of the diaphragm 233 is not maximized, so that only the second valve element 212 is pushed up by the second protrusion 231e but the first valve element 211 is not pushed up by the first protrusion 231c.

Herein, the second valve element 212 is pushed also in a direction perpendicular to a direction away from the intra-valve element seat face 211e (that is, in the valve-opening direction) by the second protrusion tapered surface 231f. Therefore, the second valve element 212 abuts an inner wall surface of the holding plate 213 to be held between the holding plate 213 and the second protrusion 231e. Therefore, a position of the second valve element 212 is stabilized, and it is possible to inhibit the second valve element 212 from vibrating due to the flow of the brake fluid and the like.

Next, when the braking force is generated by suction of the brake fluid by drive of the pump 10 at the time of self-suction, for example, in a state in which the M/C pressure is not generated such as at the time of traction control and antiskid control, when the pump 10 is driven, the pressure in the reservoir chamber 20C becomes negative pressure. At that time, since the M/C pressure is not applied to the reservoir hole 20A, the diaphragm 233 deforms as illustrated in FIGS. 6 and 7, and the deformation amount is larger than that at the time of the pressure regulation.

When the shaft 231 is also pushed to the upper side of the drawing by the plate 232 moving to the upper side of the drawing along with the deformation of the diaphragm 233 at the time of the self-suction, the second protrusion tapered surface 231f abuts the second valve element 212 and the second valve element 212 is pushed to the upper side of the drawing, the second valve element 212 separates from the intra-valve element seat face 211e and the small-diameter oil passage 211b is opened, the first protrusion tapered surface 231d abuts the guide face 211f and the first valve element 211 is pushed to the upper side of the drawing, and the guide face 211f separates from the cylinder seat face 216c and the large-diameter oil passage 216a is opened.

As a result, the large-diameter oil passage 216a is also put into an open state, so that a suction diameter may be enlarged as compared with a case in which only the small-diameter oil passage 211b is in the open state. Therefore, it is possible to improve responsiveness at the time of brake fluid pressure control.

Herein, since the guide face 211f is not perpendicular to the reciprocating direction of the first valve element 211, when the first protrusion tapered surface 231d abuts the guide face 211f and the first valve element 211 is driven to the valve-opening position, the first valve element 211 is pushed also in the direction perpendicular to the reciprocating direction of the first valve element 211.

Therefore, as illustrated in FIG. 6, in a region where the deformation amount of the diaphragm 233 is relatively small at the time of the self-suction, that is, in a low lift region where a lift amount of the first valve element 211 is small, the first valve element 211 is supported at a point E by the first protrusion 231c and abuts the cylinder seat face 216c at a point F in a position shifted by substantially 180 degrees in the circumferential direction from the portion where the first protrusion tapered surface 231d abuts to be supported by the cylinder 216.

Also, as illustrated in FIG. 7, in a region where the deformation amount of the diaphragm 233 is relatively large at the time of the self-suction, that is, in a high lift region where the lift amount of the first valve element 211 is large, the first valve element 211 is supported at the point E by the first protrusion 231c and abuts an inner wall surface of the filter component 214 at a point G in a position shifted by substantially 180 degrees in the circumferential direction from the portion where the first protrusion tapered surface 231d abuts to be supported by the filter component 214.

In this manner, when the first valve element 211 is driven to the valve-opening position, the first valve element 211 is supported at two points, so that the vibration of the first valve element 211 when the first valve element 211 is driven to the valve-opening position is inhibited. In further detail, a gap between the first valve element 211 and the cylinder seat face 216c is larger on a side supported by the first protrusion 231c. Therefore, as the brake fluid flows, the first valve element 211 tends to displace toward the side supported by the first protrusion 231c, but since the displacement is blocked by the first protrusion 231c, the vibration of the first valve element 211 is inhibited.

Next, although not illustrated, when the brake fluid is discharged into the reservoir chamber 20C through the pipeline B as in the case of the ABS control, due to the pressure of the brake fluid flowing into the reservoir chamber 20C, the piston unit 22 is moved against the elastic force of the spring 223. As a result, the W/C pressure is decreased by the amount of the brake fluid discharged, and it is possible to prevent the wheel from being locked.

As described above, in this embodiment, the guide face 211f is made non-perpendicular to the reciprocating direction of the first valve element 211, and when the first valve element 211 is driven to the valve-opening position, the first valve element 211 is supported at two points, so that it is possible to inhibit the vibration of the first valve element 211 when the first valve element 211 is driven to the valve-opening position.

Another Embodiment

Although the pressure regulating reservoir 20 according to the present invention is applied to the brake device in the above-described embodiment, the pressure regulating reservoir 20 according to the present invention may also be applied to devices other than the brake device.

It is to be noted that the present invention is not limited to the above-described embodiment, and may be appropriately changed within the scope recited in claims.

In addition, in the above-described embodiment, it goes without saying that the elements forming the embodiment are not necessarily indispensable except in a case in which it is clearly described to be especially indispensable and a case in which it is considered to be obviously indispensable in principle.

Also, in the above-described embodiment, in a case in which the number of the components, numerical values, quantity, numerical values of the ranges and the like of the embodiment are mentioned, it is not limited to the specific numbers except in a case in which it is clearly described to be especially indispensable and a case in which it is clearly limited to the specific numbers in principle.

In the above-described embodiment, when referring to the shape, positional relationship and the like of the components and the like, it is not limited to the shape, positional relationship and the like except in a case in which it is especially clearly described and a case in which it is limited to the specific shape, positional relationship and the like in principle.

The invention claimed is:

1. A pressure regulating reservoir comprising:
   a housing including an in-housing passage;
   a tubular cylinder including an in-cylinder passage communicated with the in-housing passage inside and including a cylinder seat face enclosing an end on one end side of the in-cylinder passage;
   a tubular first valve element including an intra-valve element passage communicating the in-housing passage with the in-cylinder passage inside and including an intra-valve element seat face formed in the intra-valve element passage, the first valve element brought into contact with and separating from the cylinder seat face to open and close a passage between the in-housing passage and the in-cylinder passage;
   a second valve element arranged in the intra-valve element passage and brought into contact with and separating from the intra-valve element seat face to open and close the passage between the in-housing passage and the in-cylinder passage;
   a tubular holding member in which the first valve element is arranged reciprocatably; and
   a shaft arranged in the in-cylinder passage reciprocatably which drives the first valve element and the second valve element in a valve-opening direction, wherein
   the first valve element includes a guide face on a side of a surface opposite to the cylinder seat face, the guide face being non-perpendicular to a reciprocating direction of the first valve element,
   the shaft includes a first protrusion capable of abutting the guide face and a second protrusion capable of abutting the second valve element,
   the second protrusion abuts the second valve element and the second valve element is driven in accordance with movement of the shaft in the valve-opening direction, so that the second valve element separates from the intra-valve element seat face and the passage between the in-housing passage and the in-cylinder passage is opened, and
   the first protrusion abuts the guide face and the first valve element is driven in accordance with further movement of the shaft in the valve-opening direction, so that the first valve element separates from the cylinder seat face and the passage between the in-housing passage and the in-cylinder passage is opened, wherein the second protrusion is arranged so as to be offset from a center axis of the shaft in a direction opposite to the first protrusion.

2. A pressure regulating reservoir used in a vehicle brake device provided with:
   a brake fluid pressure generating unit which generates brake fluid pressure on the basis of operation of a brake operating member;
   wheel braking force generating units which generate braking force on wheels; and
   a pump which sucks and discharges brake fluid,
   the regulating reservoir comprising:
   a housing including an inflow pipeline in which the brake fluid from the brake fluid pressure generating unit flows;
   a reservoir chamber which stores the brake fluid and to which a suction port of the pump is connected;
   a piston unit including a piston which makes capacity of the reservoir chamber variable and a spring arranged on a side opposite to the reservoir chamber across the piston to bias the piston in a direction to decrease the capacity of the reservoir chamber;
   a movable portion displaced on the basis of differential pressure between pressure in a back chamber located on a side opposite to the reservoir chamber across the piston and pressure in the reservoir chamber;
   a tubular cylinder including an in-cylinder passage communicating the reservoir chamber with the inflow pipeline inside and including a cylinder seat face enclosing an end on one end side of the in-cylinder passage;
   a tubular first valve element including an intra-valve element passage communicating the inflow pipeline with the in-cylinder passage inside and including an intra-valve element seat face formed in the intra-valve element passage, the first valve element brought into contact with and separating from the cylinder seat face to open and close a passage between the inflow pipeline and the in-cylinder passage;
   a second valve element arranged in the intra-valve element passage and brought into contact with and separating from the intra-valve element seat face to open and close the passage between the inflow pipeline and the in-cylinder passage;
   a tubular holding member in which the first valve element is arranged reciprocatably; and
   a shaft arranged in the in-cylinder passage reciprocatably which drives the first valve element and the second valve element in a valve-opening direction by moving in accordance with the displacement of the movable portion when the capacity of the reservoir chamber decreases, wherein
   the first valve element includes a guide face on a side of a surface opposite to the cylinder seat face, the guide face being non-perpendicular to a reciprocating direction of the first valve element,
   the shaft includes a first protrusion capable of abutting the guide face and a second protrusion capable of abutting the second valve element,
   the second protrusion abuts the second valve element and the second valve element is driven in accordance with movement of the shaft in the valve-opening direction, so that the second valve element separates from the intra-valve element seat face and the passage between the inflow pipeline and the in-cylinder passage is opened, and the first protrusion abuts the guide face and the first valve element is driven in accordance with further movement in the valve-opening direction of the shaft, so that the first valve element separates from the cylinder seat face and the passage between the inflow pipeline and the in-cylinder passage is opened, wherein the second protrusion is arranged so as to be offset from a center axis of the shaft in a direction opposite to the first protrusion.

3. The pressure regulating reservoir according to claim 1, wherein a diameter of the guide face is enlarged in the valve-opening direction of the first valve element.

4. The pressure regulating reservoir according to claim 3, wherein the guide face is a spherical surface.

5. The pressure regulating reservoir according to claim 3, wherein the guide face is a tapered surface.

6. The pressure regulating reservoir according to claim 1, wherein a surface which abuts the guide face of the first protrusion is an inclined surface in which a radially outer side of the shaft is higher than a radially inner side of the shaft.

7. The pressure regulating reservoir according to claim 2, wherein a diameter of the guide face is enlarged in the valve-opening direction of the first valve element.

8. The pressure regulating reservoir according to claim 7, wherein the guide face is a spherical surface.

9. The pressure regulating reservoir according to claim 7, wherein the guide face is a tapered surface.

10. The pressure regulating reservoir according to claim 2, wherein a surface which abuts the guide face of the first protrusion is an inclined surface in which a radially outer side of the shaft is higher than a radially inner side of the shaft.

* * * * *